US009678257B2

(12) United States Patent
Kim et al.

(10) Patent No.: US 9,678,257 B2
(45) Date of Patent: Jun. 13, 2017

(54) PHOTORESIST COMPOSITION FOR GREEN COLOR FILTER

(71) Applicant: Samsung Display Co., Ltd., Yongin-si (KR)

(72) Inventors: Hyunjin Kim, Pohang-si (KR); Sunwoo Kang, Hwaseong-si (KR); Daewon Lee, Asan-si (KR); Chul Huh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/986,116

(22) Filed: Dec. 31, 2015

(65) Prior Publication Data

US 2016/0327709 A1 Nov. 10, 2016

(30) Foreign Application Priority Data

May 4, 2015 (KR) ........................ 10-2015-0062664

(51) Int. Cl.
| | | |
|---|---|---|
| *G02B 5/23* | (2006.01) | |
| *G02B 5/22* | (2006.01) | |
| *C09B 47/04* | (2006.01) | |
| *G02F 1/1335* | (2006.01) | |
| *G03F 1/00* | (2012.01) | |

(52) U.S. Cl.
CPC .............. *G02B 5/223* (2013.01); *C09B 47/04* (2013.01)

(58) Field of Classification Search
USPC ...................... 8/661; 106/410, 413; 252/586; 349/106; 359/885, 891; 430/7, 270.1, 430/281.1, 321, 270.16; 548/402; 540/129, 139, 140
See application file for complete search history.

(56) References Cited

U.S. PATENT DOCUMENTS

2011/0228201 A1* 9/2011 Hsu ..................... C09B 67/0033
349/106
2014/0114077 A1* 4/2014 Kim ..................... C09B 47/067
548/402

FOREIGN PATENT DOCUMENTS

| JP | 200951774 | 3/2009 |
|---|---|---|
| KR | 1020130141047 | 12/2013 |
| KR | 1020140036623 | 3/2014 |

\* cited by examiner

*Primary Examiner* — Bijan Ahvazi
(74) *Attorney, Agent, or Firm* — H.C. Park & Associates, PLC

(57) ABSTRACT

The present disclosure relates to a photosensitive composition for a green color filter. More particularly, the present disclosure relates to a dye for a green color filter which has a high light transmittance; a photosensitive composition including the dye; and a green color filter manufactured using the photosensitive composition.

15 Claims, 1 Drawing Sheet

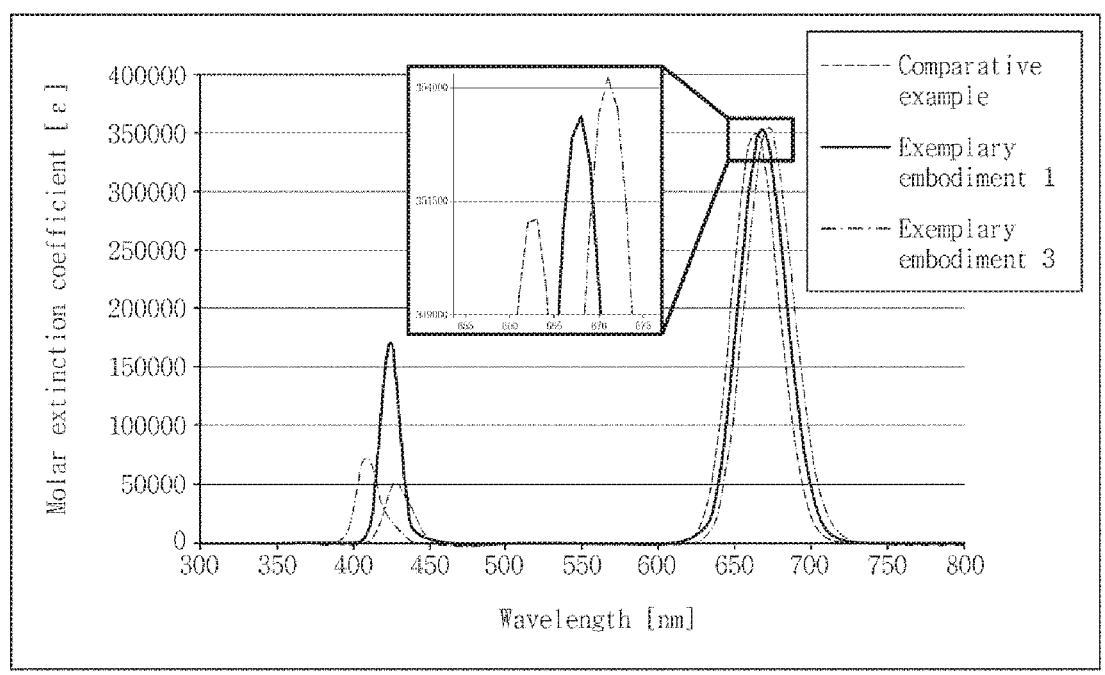

PHOTORESIST COMPOSITION FOR GREEN COLOR FILTER

CROSS-REFERENCE TO RELATED APPLICATION

This application claims the priority from and the benefit of Korean Patent Application No. 10-2015-0062664, filed on May 4, 2015, which is hereby incorporated by reference for all purposes as if fully set forth herein.

BACKGROUND

Field

The present disclosure relates to a photosensitive composition for a green color filter capable of enhancing light transmittance and improving contrast.

Discussion of the Background

Liquid crystal display ("LCD") devices have been developed to have enlarged screens and high definition. Further, LCD devices have been adopted in various devices with an increasingly wide range of applications, from a monitor of a desktop computer to a monitor of a television. In accordance with the trends, there has been an increased need for a color filter used in an LCD or the like to have a high color purity. The requirement of the high color purity is particularly important to a high-definition display device which is designed to display an image of a high quality. Light passing through the color filters is configured to display a color of a corresponding pixel and the light of the colors are mixed together to form a color image. To this end, a color filter including pixels having significantly high color purity with predetermined three colors of RGB may be preferred.

Colorants used in the color filter need to have the following characteristics: desirable light-absorbing characteristics with regard to color reproduction; free from optical drawbacks such as light scattering which may lead to a contrast decrease in an LCD device and non-uniform optical concentration which may lead to a non-uniform color or rough color impression in a solid image sensor device; suitable resistance such as thermal-resistance, light-resistance, and moisture-resistance in accordance with a product usage environment; and a great molar extinction coefficient so as to achieve slimness.

Halogenated metal phthalocyanine dyes or halogenated metal phalocyanine pigments are commonly used to form a green pixel unit. More specifically, a dye or a pigment having a halogenated metal phthalocyanine structure in which eight or more halogen atoms are bonded to a benzene ring of a phthalocyanine molecule in each phthalocyanine molecule may be used as a green colorant constituting the green pixel unit of the color filter.

Among such dyes and pigments, pigment green 36 has been widely used despite having a low transmittance, and pigments are being developed to improve the low transmittance. In this regard, a C.I. pigment green 58, which is formed of polyhalogenated zinc phthalocyanine, has recently been developed as a pigment that may overcome the drawback, and is suggested as a pigment for a color filter.

Further, a scheme of using a dye, in lieu of a pigment, as a colorant has been suggested. However, a coloring curable composition including a dye needs to be added in large amounts when the dye has low molar extinction coefficient ($\epsilon$). Accordingly, the amount of other components, such as a polymerization compound (monomer), a binder, or a photopolymerization initiator, in the coloring curable composition are necessarily reduced. As a result, curing properties, thermal-resistance after curing, and development properties of the composition may deteriorate.

Accordingly, there exists a need for a development of a dye improved in quality for being used in the manufacturing of the color filter of the LCD device.

The above information disclosed in this Background section is only for enhancement of understanding of the background of the inventive concept, and, therefore, it may contain information that does not form the prior art that is already known to a person of ordinary skill in the art.

SUMMARY

Exemplary embodiments are directed to a colorant including a high-transmissive green dye, to a photosensitive composition including the colorant, and to a color filter formed of the photosensitive composition.

Additional aspects will be set forth in the detailed description which follows, and, in part, will be apparent from the disclosure, or may be learned by practice of the inventive concept.

An exemplary embodiment discloses a dye represented by the following Chemical Formula 1,

[Chemical Formula 1]

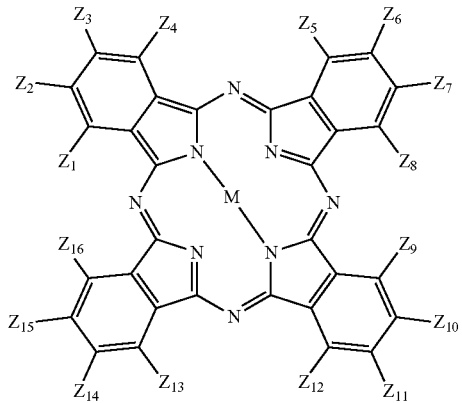

wherein M may be copper (Cu) or zinc (Zn), wherein each of Z2, Z3, Z6, Z7, Z10, Z11, Z14, and Z15 is independently selected from the group consisting of a halogen atom, substituted or unsubstituted alkyl ether, and substituted or unsubstituted aryl ether, and wherein each of Z1, Z4, Z5, Z8, Z9, Z12, Z13 and Z16 is independently selected from the group consisting of hydrogen (H), substituted or unsubstituted alkyl ether, and substituted or unsubstituted aryl ether.

An embodiment also discloses a photosensitive composition including: a colorant; a binder resin; a cross-linking agent; a photopolymerization initiator; and a solvent. The colorant may include a dye represented by the following Chemical Formula 1,

[Chemical Formula 1]

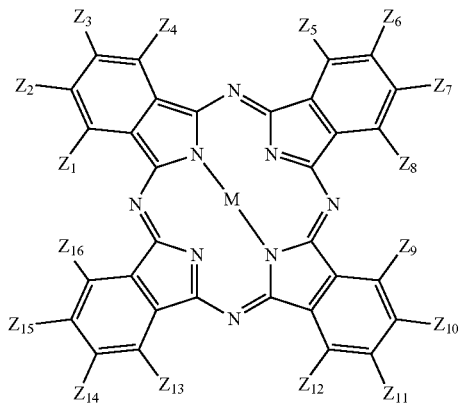

wherein M may be copper (Cu) or zinc (Zn), wherein each of Z2, Z3, Z6, Z7, Z10, Z11, Z14, and Z15 is independently selected from the group consisting of a halogen atom, substituted or unsubstituted alkyl ether, and substituted or unsubstituted aryl ether, and wherein each of Z1, Z4, Z5, Z8, Z9, Z12, Z13 and Z16 is independently selected from the group consisting of hydrogen (H), substituted or unsubstituted alkyl ether, and substituted or unsubstituted aryl ether.

An embodiment further discloses a color filter manufactured using the photosensitive composition.

The foregoing general description and the following detailed description are exemplary and explanatory and are intended to provide further explanation of the claimed subject matter.

BRIEF DESCRIPTION OF THE DRAWINGS

The accompanying drawing, which is included to provide a further understanding of the inventive concept, and is incorporated in and constitutes a part of this specification, illustrates exemplary embodiments of the inventive concept, and, together with the description, serve to explain principles of the inventive concept.

FIG. 1 is a graph illustrating the comparison of molar extinction coefficients between a dye according to exemplary embodiments and a conventionally used pigment.

DETAILED DESCRIPTION OF THE ILLUSTRATED EMBODIMENT

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements.

For the purposes of this disclosure, "at least one of X, Y, and Z" and "at least one selected from the group consisting of X, Y, and Z" may be construed as X only, Y only, Z only, or any combination of two or more of X, Y, and Z, such as for instance, XYZ, XYY, YZ, and ZZ. Like numbers refer to like elements throughout. As used herein, the "and/or" includes any and all combinations of one or more of the associated listed items.

Although the terms first, second, etc. may be used herein to describe various elements and components, these elements and/or components should not be limited by these terms. These terms are used to distinguish one element and/or component from another element and/or component. Thus, a first element and/or component discussed below could be termed a second element and/or component without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawing.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments provide a dye for a green color filter, a photosensitive composition for the green color filter including the dye, and a color filter manufactured using the photosensitive composition.

According to an exemplary embodiment, a dye for a green color filter may be represented by the following Chemical Formula 1.

According to an exemplary embodiment, a photosensitive composition may include a colorant including the dye represented by the following Chemical Formula 1; a binder resin; a cross-linking agent; a photopolymerization initiator; and a solvent.

According to an exemplary embodiment, a color filter may be manufactured using the photosensitive composition including the dye represented by the following Formula 1.

Dye

A dye according to an exemplary embodiment includes a composition represented by the following Chemical Formula 1,

[Chemical Formula 1]

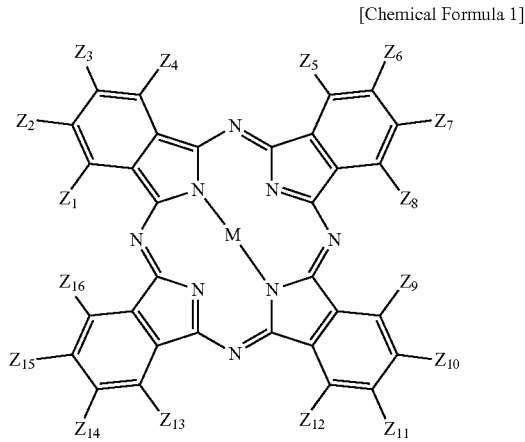

wherein M is copper (Cu) or zinc (Zn),

Z2, Z3, Z6, Z7, Z10, Z11, Z14, and Z15 are the same as or different from each other and each of Z2, Z3, Z6, Z7, Z10, Z11, Z14, and Z15 may be independently selected from the group consisting of a halogen atom, substituted or unsubstituted alkyl ether, and substituted or unsubstituted aryl ether, and Z1, Z4, Z5, Z8, Z9, Z12, Z13 and Z16 are the same as or different from each other and each of Z1, Z4, Z5, Z8, Z9, Z12, Z13 and Z16 may be independently selected from the group consisting of hydrogen (H), substituted or unsubstituted alkyl ether, a substituted or unsubstituted aryl ether. The substituted or unsubstituted alkyl ether has 6 or more carbon atoms, and the substituted or unsubstituted aryl ether has 6 or more carbon atoms.

According to an exemplary embodiment, phthalocyanine which is currently used as a pigment is mainly used as a dye for a green color filter.

Since the phthalocyanine has an excellent resistance such as thermal-resistance or light-resistance and has vivid blue and green colors having a significantly large molar extinction coefficient of about 200,000 m$^2$/mol or more, the phthalocyanine currently used as a pigment type was used as a main dye of a green color filter.

According to an exemplary embodiment, an ether link and a bulk-sized alkyl/aryl substituent are introduced at both of a non-peripheral (α) position and a peripheral (β) position of an isoindole part of a phthalocyanine pigment having excellent resistance and vivid color.

In a case where a substituent is introduced at the non-peripheral (α) position of the isoindole part of the phthalocyanine pigment, a wavelength is shifted toward a long wavelength, in comparison with a case where the substituent is introduced at the peripheral (β) position. Further, due to an increase in steric hindrance, solubility may be improved.

Further, as a wavelength may vary based on a base metal, an introduced metal leads a wavelength to be shifted toward a shorter wavelength, in comparison with a wavelength of phthalocyanine which is non-metal, and a substituent introduced at the isoindole part leads a wavelength to be shifted toward a longer wavelength. Accordingly, based on a suitable combination of the base metal and the substituent, a color is developed from a blue color to a green color.

According to an exemplary embodiment, a bulk-sized substituent is introduced at the peripheral (β) position of the isoindole part and a substituent is introduced at the non-peripheral (α) position of the isoindole part at a time.

M is a base metal, and any metal capable of forming a four-coordinate bonding to a six-coordinate bonding may be used as M without limitation. In general, zinc (Zn) or copper (Cu) is used as the base metal.

The substituted or unsubstituted alkyl ether may have 6 or more carbon atoms, and the substituted or unsubstituted aryl ether may have 6 or more carbon atoms.

The aforementioned Z2, Z3, Z6, Z7, Z10, Z11, Z14, and Z15 represent a substituent at the peripheral (β) position of the isoindole part, and each of Z2, Z3, Z6, Z7, Z10, Z11, Z14, and Z15 may be independently selected from the group consisting of a halogen atom,

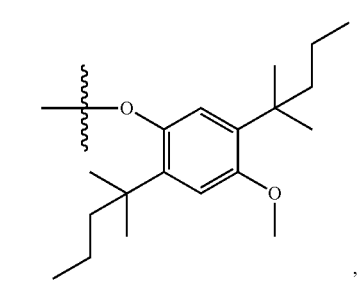

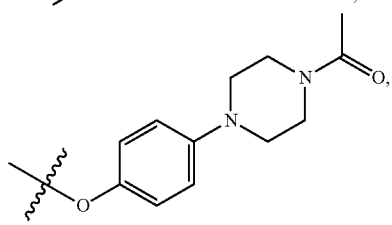

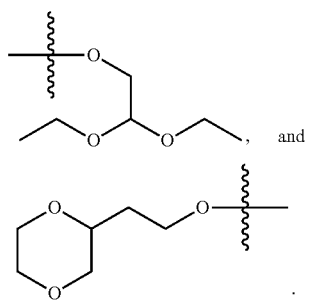

The aforementioned Z1, Z4, Z5, Z8, Z9, Z12, Z13, and Z16 represent a substituent at the non-peripheral (α) position of the isoindole part, and each of Z1, Z4, Z5, Z8, Z9, Z12, Z13, and Z16 may be independently selected from the group consisting of hydrogen (H),

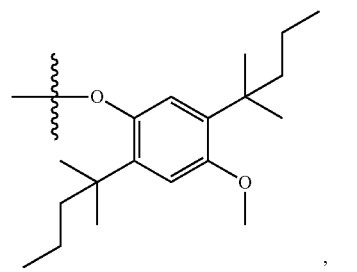

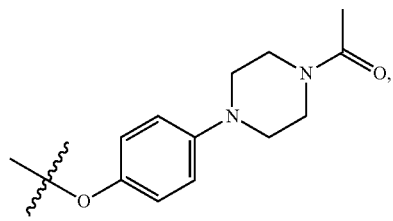

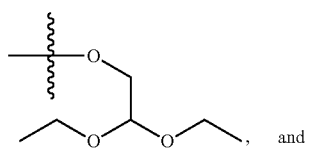

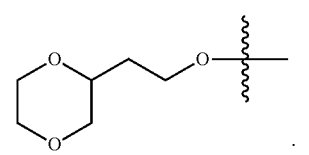

Examples of a precursor of the dye according to an exemplary embodiment may include chemical compounds represented by the following Structural Formulas 1 through 7, but aspects of the present invention are not limited thereto.

[Structural Formula 1]

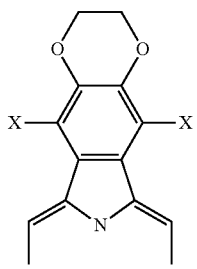

[Structural Formula 2]
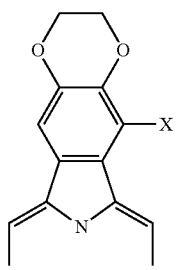
[Structural Formula 3]
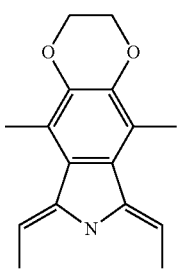
[Structural Formula 4]
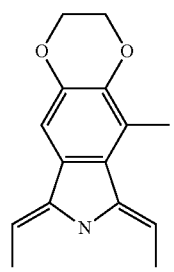
[Structural Formula 5]
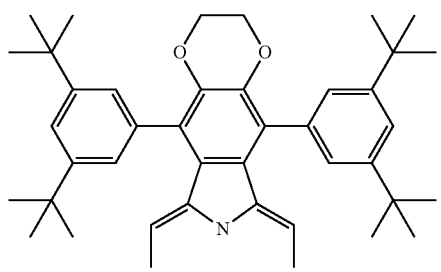
[Structural Formula 6]
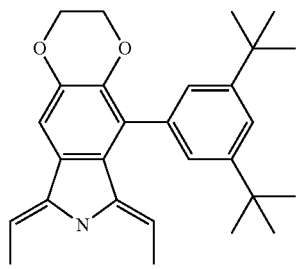
[Structural Formula 7]
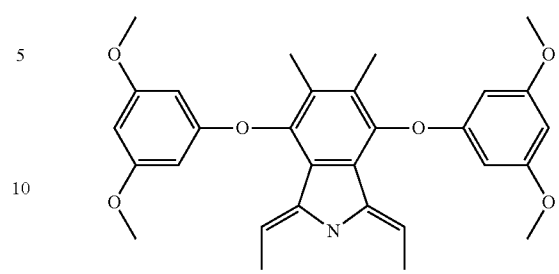
According to an exemplary embodiment, reaction formulas of dye composition are represented by the following Reaction Formulas 1, 2, and 3.
[Reaction Formula 1]
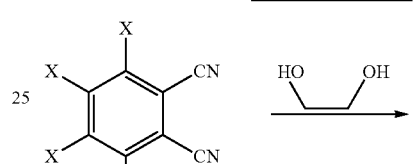
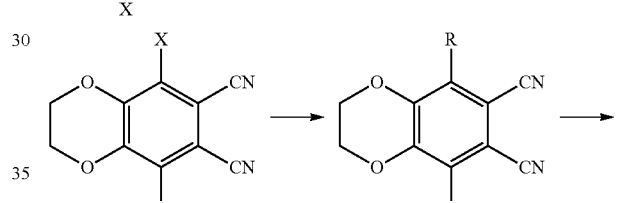
[Reaction Formula 2]
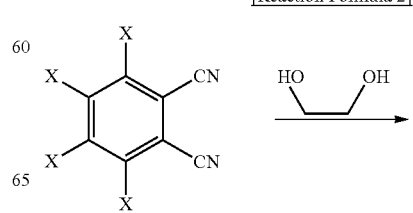

-continued

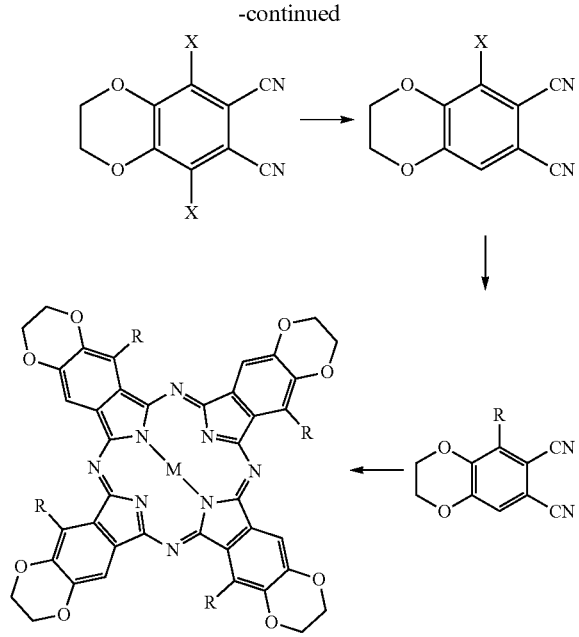

[Reaction Formula 3]

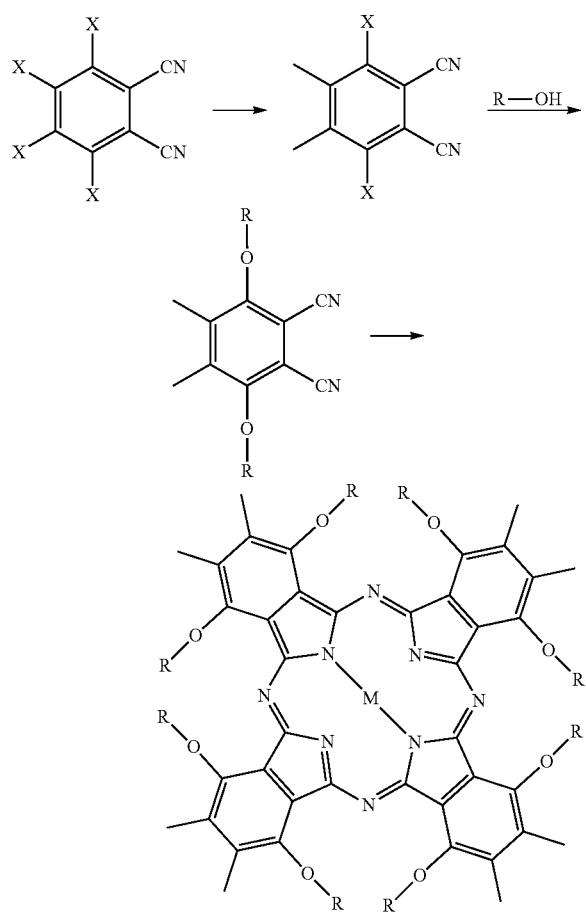

In Reaction Formulas 1, 2, and 3, X is a halogen atom including fluorine (F), chlorine (Cl), bromine (Br), and iodine (I), R is a substituent including H, C—, N—, O—, or S—, and M is zinc (Zn) or copper (Cu) according to an exemplary embodiment.

Photosensitive Composition

According to an exemplary embodiment, the photosensitive composition includes: a colorant including a phthalocyanine-based dye; a binder resin; a cross-linking agent; a photopolymerization initiator; and a solvent.

Hereinafter, each component will be described in more detail.

Colorant

The colorant used in an exemplary embodiment includes the aforementioned phthalocyanine-based dye.

Since the dye is previously described hereinabove, the repeated description will be omitted for conciseness.

The amount of the phthalocyanine-based dye is in a range of about 5 percentage by weight (wt %) to about 50 wt % with respect to the total weight of the colorant. The amount of the colorant is in a range of about 10 wt % to about 60 wt % with respect to the total weight of the photosensitive composition. In a case where the amount of the phthallocyanine-based dye is less than about 5 wt % with respect to the total weight of the colorant, an effect of an increase in light transmittance is substantially difficult to be achieved. In a case where the amount of the phthalocyanine-based dye is more than about 50 wt % with respect to the total weight of the colorant, thermal-stability and light-stability may deteriorate. In a case where the amount of the colorant is less than about 10 wt % with respect to the total weight of the photosensitive composition, the coloring effect may not be sufficiently obtained. In a case where the amount of the colorant is more than about 60 wt % with respect to the total weight of the photosensitive composition, light transmittance may be diminished.

Binder Resin

The binder resin may include a hydroxyaromatic polymer which is soluble in an alkaline solution such as an aqueous alkaline developer, and insoluble in water.

The binder resin may form a cross-linking in the presence of the cross-linking agent, and before forming the cross-linking, the binder resin may be soluble in the aqueous alkaline developer. On the other hand, after forming the cross-linking, the binder resin may be insoluble in the alkaline solution.

For example, the binder resin may include a phenolic resin, an acrylic resin, and the like. The phenolic resin may be formed through condensation polymerization of an aldehyde compound such as formaldehyde and a phenolic compound. Examples of the phenolic compound include ortho-cresol, meta-cresol, 2,4-xylenol, 3,4-xylenol, novolak derived therefrom, and the like.

The phenolic compound may be used solely or in combination of two or more thereof. In more detail, examples of the binder resin may include poly (vinyl phenol) such as poly (para-hydroxystyrene) and poly (para-hydroxy-alpha-methylstyrene); a copolymer copolymerized from para-hydroxy styrene, para-hydroxy-alpha-methyl-styrene, acetoxy styrene, acrylic acid or methacrylic acid; a hydroxyphenyl-carbonyl polymer; a novolak/poly (vinyl phenol) copolymer; or the like, which may be used solely or in combination of two or more thereof.

The amount of the binder resin is in a range of about 5 wt % to about 40 wt % with respect to the total weight of the photosensitve composition. In a case where the amount of the binder resin is less than about 5 wt %, stability of the shape of the photosensitive layer is relatively low. In a case where the amount of the binder resin is more than about 40 wt %, it is difficult to obtain a photosensitive layer having a uniform thickness.

In a case where the amount of the binder resin is within the aforementioned range, dispersion may occur efficiently to maintain suitable viscosity. Accordingly, when the binder resin is applied to a product, the product may maintain optical, physical, and chemical qualities.

Cross-Linking Agent

The cross-linking agent according to an exemplary embodiment includes oligomer that may form cross-linking of the binder resin. The cross-linking agent may prevent the binder resin in a light exposure area from being dissolved in an alkali solution, such that a pattern of the photosensitive layer may be formed.

The cross-linking agent includes aminoplast and an amine compound such as urea, melamine, and glycoluril. Examples of the cross-linking agent may include urea-formaldehyde oligomer, melamine-formaldehyde oligomer, benzoguanamine-formaldehyde oligomer, glycoluril-formaldehyde oligomer, hexa (methoxymethyl) melamine oligomer, or the like. In particular, the cross-linking agent may include hexa (methoxymethyl) melamine oligomer.

The amount of the cross-linking agent s in a range of about 1 wt % to about 15 wt % with respect to the total weight of the photosensitve composition. In a case where the amount of the cross-linking agent is less than about 1 wt %, photopolymerization may not be sufficiently performed. In a case where the amount of the cross-linking agent is more than about 15 wt %, it is economically disadvantageous.

Photopolymerization Initiator

The photopolymerization initiator according to an exemplary embodiment is a compound that may initiate polymerization of the cross-linking agent upon irradiation of light such as ultraviolet (UV) light.

Examples of the polymerization initiator may include a triazine-based compound, an acetophenone-based compound, a xanthone-based compound, a benzoin-based compound, and an imidazole-based compound, which may be used solely or in combination of two or more thereof.

Examples of the triazine-based compound may include 2,4-bis trichloromethyl-6-p-methoxystyryl-s-triazine, 2-p-methoxy-styryl-4,6-bis trichloromethyl-s-triazine, 2,4-trichloromethyl-6-triazine, 2-(2-bromo-4-methylphenyl)-4,6-bis (trichloromethyl)-s-triazine, and the like. The trazine-based initiator may generate a gas of a halogen compound, when exposed to light, such that an apparatus such as a mask may be contaminated and luminance may deteriorate. Accordingly, it is desirable that the content of the trazine-based initiator be used in the amount of less than 1 wt % with respect to the total weight of the photosensitive composition.

Examples of the acetophenone-based compound may include benzophenone, p-(dimethylamino)benzophenone, 2,2-dichloro-4-phenoxy acetophenone, 4,4-bis diethylamino benzophenone, 2,2-diethoxyacetophenone, 2,2-dibutoxy acetophenone, 2-hydroxy-2-methylpropiophenone, p-t-butyl trichloro acetophenone, and the like.

Examples of the xanthone-based compound may include xanthone, thioxanthone, 2-methyl thioxanthone, 2-isobutyl thioxanthone, 2-dodecyl thioxanthone, 2,4-dimethyl thioxanthone, and the like.

Examples of the benzoin-based compound may include benzoin, benzoin ethyl ether, benzoin methyl ether, benzoyl propyl ether, t-butyl benzoyl ether, and the like.

Examples of the imidazole-based compound may include 2,2-bis-2-chlorophenyl-4,5,4,5-tetraphenyl-2-1,2-biimidazole, 2,2-bis(2,4,6-triciano-phenyl) 4,4,5,5-tetraphenyl-1,2-biimidazole, and the like.

The amount of the photopolymerization initiator is in a range of about 0.5 wt % to about 5 wt % with respect to the total weight of the photosensitve composition. In a case where the amount of the photopolymerization initiator is less than about 0.5 wt %, photopolymerization may not be sufficiently performed. In a case where the amount of the photopolymerization initiator is more than about 5 wt %, light absorptivity may considerably increase, such that photopolymerization may not be sufficiently performed below the photosensitive layer.

Solvent

A solvent included in the photosensitive composition is not particularly limited, and any known solvent may be used solely or in combination of two or more as necessary.

Examples of the solvent may include: alcohol such as methanol and ethanol; ether such as tetrahydrofuran; glycol ether such as ethylene glycol monomethyl ether and ethylene glycol monoethyl ether; acetate such as methyl cellosolve acetate, ethyl cellosolve acetate, and ethylene glycol alkyl ether; diethylene glycol such as diethylene glycol monomethyl ether, diethylene glycol monoethyl ether, diethylene glycol dimethyl ether; propylene glycol monoalkyl ether such as propylene glycol methyl ether, propylene glycol ethyl ether, propylene glycol propyl ether, propylene glycol butyl ether; propylene glycol alkyl ether acetate such as propylene glycol methyl ether acetate, propylene glycol ethyl ether acetate, propylene glycol propyl ether acetate, propylene glycol butyl ether acetate; propylene glycol alkyl ether propionate such as propylene glycol methyl ether propionate, propylene glycol ethyl ether propionate, propylene glycol propyl ether propionate and propylene glycol butyl ether propionate; aromatic hydrocarbon such as toluene and xylene; ketone such as methyl ethyl ketone, cyclohexanone, 4-hydroxy-4-methyl-2-pentanone; and ester such as methyl acetate, ethyl acetate, propyl acetate, butyl acetate, 2-hydroxy propionic acid ethyl, 2-hydroxy 2-methyl propionic acid methyl, 2-hydroxy 2-methyl propionic acid ethyl, hydroxymethyl acetate, hydroxyethyl acetate, hydroxybutyl acetate, lactic acid methyl, lactic acid ethyl, lactic acid propyl, lactic acid butyl, 3-hydroxy-propionic acid methyl, 3-hydroxy-propionic acid ethyl, 3-hydroxy-propionic acid propyl, 3-hydroxy-propionic acid butyl, 2-hydroxy-3-methyl butanoic acid methyl, methoxy-methyl acetate, methoxy-ethyl acetate, methoxy-propyl acetate, methoxy-butyl acetate, ethoxy-methyl acetate, ethoxy-ethyl acetate, ethoxy-propyl acetate, ethoxy-butyl acetate, propoxy-methyl acetate, propoxy-ethyl acetate, propoxy-propyl acetate, propoxy-butyl acetate, butoxy-methyl acetate, butoxy-ethyl acetate, butoxy-propyl acetate, butoxy-butyl acetate, 2-methoxy-propionic acid methyl, 2-methoxy-propionic acid ethyl, 2-methoxy-propionic acid propyl, 2-methoxy-propionic acid butyl, 2-ethoxy-propionic acid methyl, 2-ethoxy-propionic acid ethyl, 2-ethoxy-propionic acid propyl, 2-ethoxy-propionic acid butyl, 2-butoxy-propionic acid methyl, 2-butoxy-propionic acid ethyl, 2-butoxy-propionic acid propyl, 2-butoxy-propionic acid butyl, 3-methoxy-propionic acid methyl, 3-methoxy-propionic acid ethyl, 3-methoxy-propionic acid propyl, 3-methoxy-propionic acid butyl, 3-ethoxy-propionic acid methyl, 3-ethoxy-propionic acid ethyl, 3-ethoxy-propionic acid propyl, 3-ethoxy-propionic acid butyl, 3-propoxy-propionic acid methyl, 3-propoxy-propionic acid ethyl, 3-propoxy-propionic acid propyl, 3-propoxy-propionic acid butyl, 3-butoxy-propionic acid methyl, 3-butoxy-propionic acid ethyl, 3-butoxy-propionic acid propyl, and 3-butoxy-propionic acid butyl; and the like, which may be used solely or in combination of two or more thereof.

In particular, glycol ether, ethylene glycol alkyl ether acetate, and diethylene glycol which may be excellent in solubility and reactivity with each substance and may be advantageous in formation of a coating layer may be used.

The amount of the solvent is in a range of about 20 wt % to about 70 wt % with respect to the total weight of the photosensitve composition. In a case where the amount of the solvent is less than about 20 wt %, viscosity of the photosensitive composition may be diminished, such that it is difficult to form a uniform photosensitive layer. In a case where the amount of the solvent s more than about 70 wt %, it may be difficult to form a photosensitive layer having a sufficient thickness. In other words, physical and optical properties of the product to which the solvent is applied may be affected by the content of the solvent.

Other Additives

The photosensitive composition may further include an additive such as a surfactant, a dispersant, an adhesive, and the like. It is desirable that the amount of the additive is in a range of about 1 wt % to about 3 wt % with respect to the total weight of the photosensitive composition. In a case where the amount of the additive is less than about 1 wt %, the adhesive property of the photosensitive layer may deteriorate. In a case where the amount of the additive is more than about 3 wt %, the development thereof may be non-uniform.

The surfactant may be used to improve a coating property or a development property of the photosensitive composition. Examples of the surfactant may include: polyoxyethylene octylphenyl ether, polyoxyethylene nonylphenyl ether, F171, F172, and F173 (product name; Dainippon Ink and Chemicals Industry Co., Ltd, Japan), FC430, FC431 (product name: Sumitomo 3M Ltd., Japan), KP341 (product name; Shinwol Chemical, Co. Ltd., Korea, Republic of), and the like.

Examples of the dispersant may include: amid or a salt formed by reaction of polyalkylene imine and polyester including a free carboxyl group; polycarboxylic acid ester, unsaturated polyamide, polycarboxylic acid, polycarboxylic acid amine salt, polycarboxylic acid ammonium salt, polycarboxylic acid alkyl amine salt, polysiloxane, polycarboxylic ester including a hydroxyl group, and derivatives thereof; (meth) acrylic acid-styrene copolymer; (meth) acrylic acid-(meth) acrylic acid ester copolymer; styrene-maleic acid copolymer; polyvinyl alcohol; polyvinyl pyrrolidone; and the like, which may be used solely or in combination of two or more thereof.

The adhesive may improve adhesion of the substrate. The adhesive may include a silane coupling agent including a reactive substituent such as a carboxyl group, a methacrylic group, an isocyanate group, and an epoxy group. In more detail, examples of the adhesive may include gamma (γ)-methacrylate oxypropyl trimethoxysilane, vinyltriacetoxysilane, vinyltrimethoxysilane, (γ)-isocyanate propyl triethoxysilane, (γ)-glycidoxypropyltrimethoxysilane, beta (β)-(3,4-epoxycyclohexyl ethyl trimethoxy silane, and the like, which may be used solely or in combination of two or more thereof.

The photosensitive composition is coated on a substrate through a coating method such as a spraying method, a roll coater method, and a sping coating method, and formed into a coating layer through a prebake process.

Color Filter

The color filter according to an exemplary embodiment may be manufactured using a colorant including a dye represented by Chemical Formula 1; a binder resin; a cross-linking agent; a photopolymerization initiator; and a solvent.

By way of example, a method of forming the color filter may include: forming a photosensitive composition for a color filter; coating the photosensitive composition on a substrate; performing light exposure on the photosensitive composition; and performing thermal-curing of the photosensitive composition. However, the method of forming the color filter is not limited thereto, and any known method to form the color filter using a conventional photosensitive composition may be at least partially employed to manufacture the color filter.

The color filter which is formed using the photosensitive composition including the dye according to an exemplary embodiment may exhibit a high luminance.

Hereinafter, various aspects of the present invention will be described in more detail with detailed exemplary embodiments.

The following exemplary embodiments are with regard to the composition of the dye according to an exemplary embodiment. However, aspects of the present invention are not necessarily limited thereto, and modifications to various exemplary embodiments may be employed by one of ordinary skill in the art.

Exemplary Embodiment 1

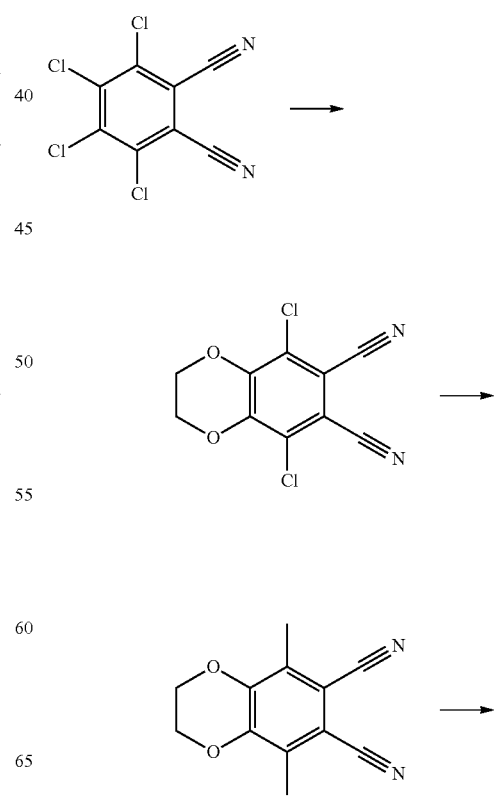

-continued

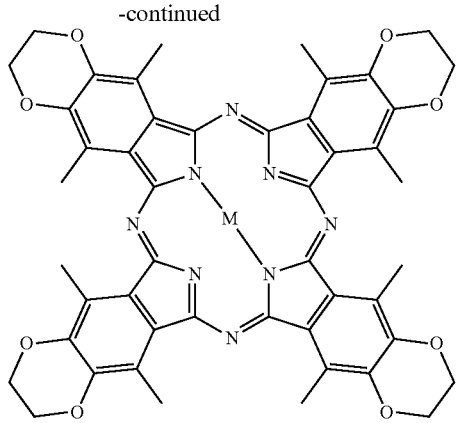

3,4,5,6-tetrachlorophthalonitrile of 6 g (3 eq), KF of 1.8 g (3.1 eq), CaCO₃ of 0.5 g (0.5 eq) and 1,2 ethanol of 2.5 g (4 eq) are put in acetone of about 30 ml to about 50 ml (30 eq), and reaction proceeds at room temperature overnight. When the completion of the reaction is verified by thin later chromatography (TLC), work-up is carried out. Subsequently, a resultant product is separated and purified by column chromatography.

Dichloro-2,3-dihydrobenzo-[1,4]dioxin-6,7-dicarbonitrile of 2.5 g (1 eq), 10 mol % Pd (PPh₃)₄ of 1.2 g, K₂CO₃ of 4 g (3 eq) and trimethylboroxine (TMB) of 1.3 g (1 eq) are put into 1,4-dioxane of about 20 ml to about 30 ml (20 eq), and refluxed in an oil bath (oil-bath) under a nitrogen atmosphere for 6 hours, and then the reaction proceeds overnight at room temperature. When the completion of the reaction is verified by thin later chromatography (TLC), a solid suspension is filtered out using a celite filter. A residual solution obtained by the filter is washed using a THF and then work-up is performed. Subsequently, a resultant product is separated and purified by performing column chromatography under the condition that hexane:ethyl acetate=4:1.

A cyclization reaction through cross condensation is performed by adding ZnCl₂ of 1.6 (1.2 eq) and DBU of 1.5 g (1 eq) are added to perform the cyclization reaction at 100° C. under a nitrogen atmosphere.

Exemplary Embodiment 2

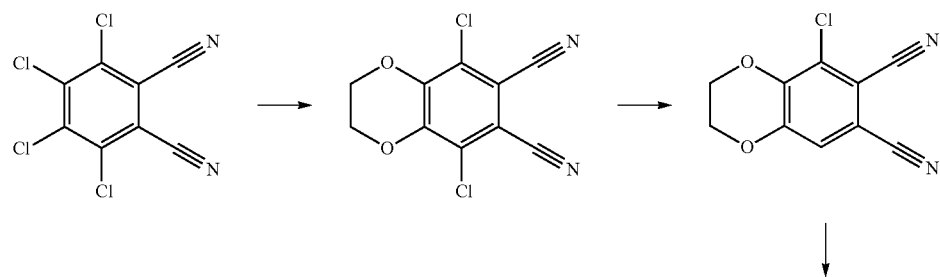

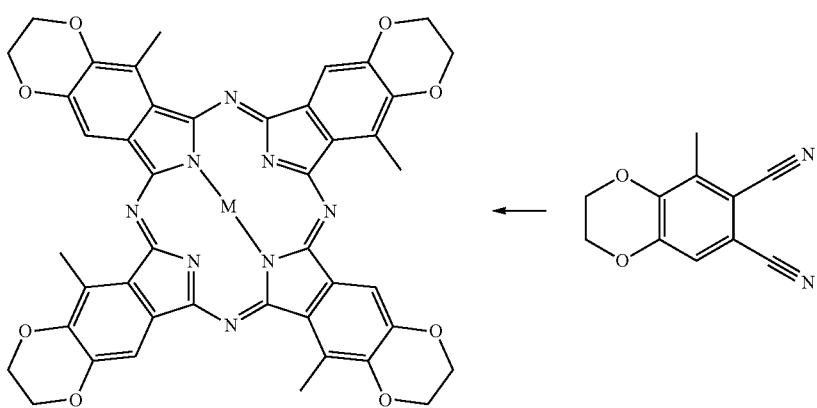

3,4,5,6-tetrachlorophthalonitrile of 6 g (3 eq), KF of 1.2 g (2.1 eq), CaCO₃ of 0.5 g (0.5 eq) and 1,2 ethanol of 2.5 g (4 eq) are put in acetone of about 30 ml to about 50 ml (30 eq), and reaction proceeds at room temperature overnight. When the completion of the reaction is verified by thin later chromatography (TLC), work-up is carried out. Subsequently, a resultant product is separated and purified by column chromatography.

After dichloro-2,3-dihydrobenzo-[1,4]dioxin-6,7-dicarbonitrile of 2.5 g (1 eq) is put into a mixture of 300 ml including THF and distilled water, zinc powder (zinc dust) of 2.6 g (4 eq) is added and stirred in an ice bath for 5 minutes. Then, sulfuric acid is added dropwise, and when the sulfuric acid has a color converted to a light brown color, reaction proceeds for about an hour more. After verifying completion of the reaction by TLC, neutralization is performed by NaOH aqueous solution, and then solid suspension is filtered out by a celite filter. When the reaction is stopped, the residual solution obtained by the filter is saturated with methylene chloride, and then is separated and purified three times by adding hexane so as to be recrystallized.

Methylation and cyclization by Suzuki-Miyaura coupling is performed under the same conditions as in Exemplary Embodiment 1.

Exemplary Embodiment 3

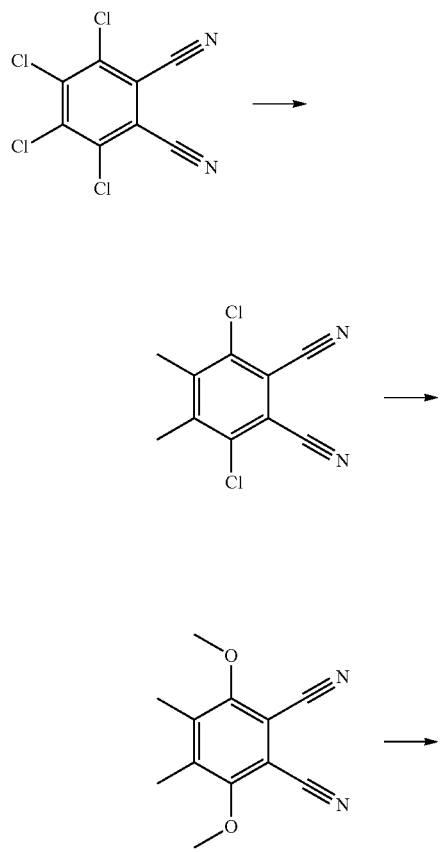

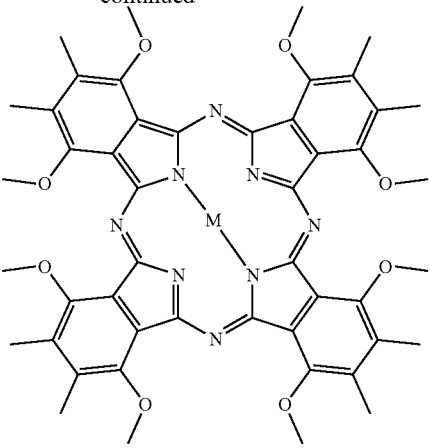

3,4,5,6-tetrachlorophthalonitrile of 6 g (1 eq), 10 mol % Pd (PPh₃)₄, K₂CO₃ of 3 eq and trimethylboroxine (TMB) of 1.2 eq are put into 1,4-dioxane of 20 eq, and stirred in an ice bath for 6 hours, and then reaction proceeds overnight at room temperature. After verifying completion of the reaction by TLC, solid suspension is filtered out by a celite filter. A residual solution obtained by the filter is washed using a THF and then treated. Subsequently, a resultant product is separated and purified by performing column chromatography under the condition that hexane:ethyl acetate=4:1.

The intermediate substance of 6.7 g (3 eq), KF of 1.8 g (3.1 eq), CaCO₃ of 0.5 g eq) and alcohol of 2.3 g (4 eq) are put in acetone of about 20 ml to about 50 ml (30 eq), and reaction proceeds at room temperature overnight. When the completion of the reaction is verified by thin later chromatography (TLC), work-up is carried out. Subsequently, a resultant product is separated and purified by column chromatography.

The cyclization reaction is performed under the condition the same as the condition of Exemplary Embodiment 1.

Analyzation on Characteristics of Spectrum of a Dye

With respect to the dyes obtained by the above-described Exemplary Embodiments 1, 2, and 3, absorption and transmittance spectrums are analyzed.

FIG. 1 is a graph illustrating comparison of a molar extinction coefficient between a dye according to exemplary embodiments and a conventionally used pigment.

In reference to FIG. 1, it is verified that molar extinction coefficients of the dyes according to exemplary embodiments (Exemplary Embodiments 1, 2, and 3) increase and light transmittance thereof also increase, in comparison with those of a conventional pigment, pigment green G58 (comparative example).

In more detail, while a peak wavelength of the comparative example is 663 nm, a peak wavelength of Exemplary Embodiments 1 and 3 are measured to be 668 nm and 672 nm, respectively. Accordingly, it is appreciated that the dye according to an exemplary embodiment may shift a wavelength toward a long wavelength by about 5 nm or more, in comparison with the wavelength of the conventional dye, thereby improving a light transmittance of a green color.

Further, in comparison with the value of epsilon (ϵ) of the peak wavelength of the comparative example, an increase in the value of epsilon (ϵ) of the peak wavelength of the Exemplary Embodiments 1 and 3 is verified. Accordingly, the dye according to an exemplary embodiment has an increased molar extinction coefficient, in comparison with that of the conventional dye, and thereby it is appreciated that the absorptivity thereof is increased.

The pigment according to an exemplary embodiment and the photosensitive composition including the pigment may be efficiently used in a color filter of a display device. For example, the pigment and the photosensitive composition may be suitably applied to a green pixel unit of the color filter.

As set forth above, according to one or more exemplary embodiments, a dye for a color filter which has a high light transmittance may be provided.

According to one or more exemplary embodiments, a photosensitive composition including the dye, which has a high dispersion stability and a high light transmittance may be provided.

Through the use of the photosensitive composition according to one or more exemplary embodiments, a color filter having a high luminance may be provided.

Further, according to one or more exemplary embodiments, a display device including the color filter having a high luminance may have improved contrast.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A dye represented by the following Chemical Formula 1,

[Chemical Formula 1]

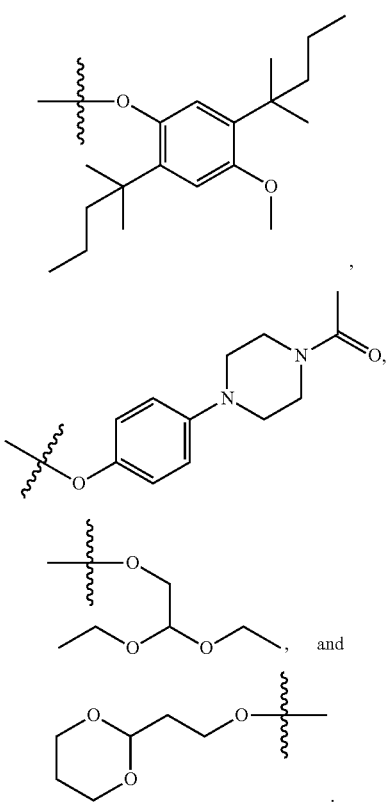

wherein M is copper (Cu) or zinc (Zn), wherein each of $Z_2$, $Z_3$, $Z_6$, $Z_7$, $Z_{10}$, $Z_{11}$, $Z_{14}$, and $Z_{15}$ is independently selected from the group consisting of a substituted or unsubstituted alkyl ether and a substituted or unsubstituted aryl ether, and wherein each of $Z_1$, $Z_4$, $Z_5$, $Z_8$, $Z_9$, $Z_{12}$, $Z_{13}$, and $Z_{16}$ is independently selected from the group consisting of a substituted or unsubstituted alkyl ether and a substituted or unsubstituted aryl ether.

2. The dye of claim 1, wherein:

any substituted or unsubstituted alkyl ether of $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, and $Z_{16}$ has 6 or more carbon atoms, and any substituted or unsubstituted aryl ether of $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, and $Z_{16}$ has 6 or more carbon atoms.

3. The dye of claim 1, wherein each of the $Z_2$, $Z_3$, $Z_6$, $Z_7$, $Z_{10}$, $Z_{11}$, $Z_{14}$, and $Z_{15}$ is independently selected from the group consisting of

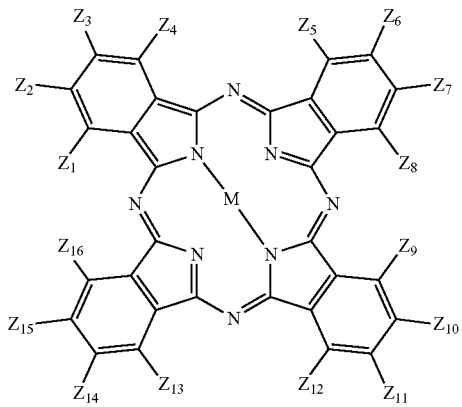

4. The dye of claim 1, wherein each of the $Z_1$, $Z_4$, $Z_5$, $Z_8$, $Z_9$, $Z_{12}$, $Z_{13}$, and $Z_{16}$ is independently selected from the group consisting of

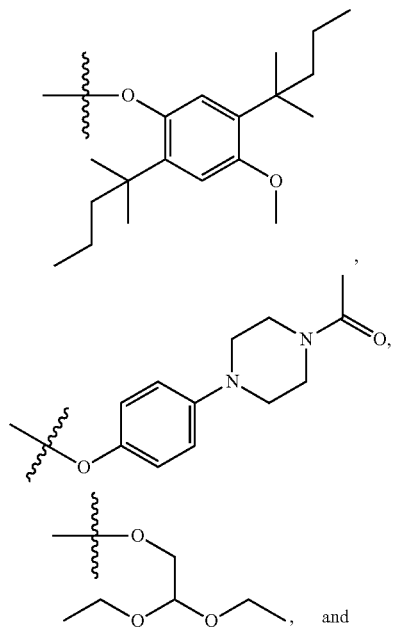

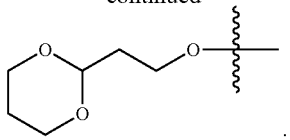

5. A photosensitive composition comprising:
a colorant;
a binder resin;
a cross-linking agent;
a photopolymerization initiator; and
a solvent,
wherein the colorant comprises a dye represented by the following Chemical Formula 1,

[Chemical Formula 1]

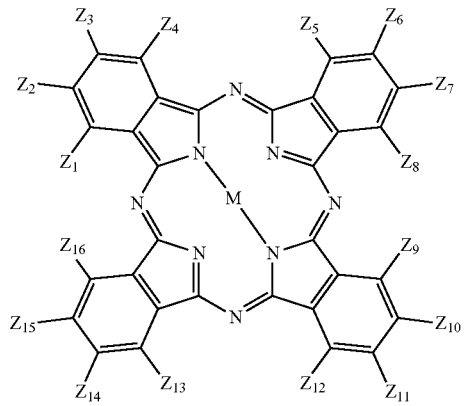

wherein M is copper (Cu) or zinc (Zn),
wherein each of $Z_2$, $Z_3$, $Z_6$, $Z_7$, $Z_{10}$, $Z_{11}$, $Z_{14}$, and $Z_{15}$ is independently selected from the group consisting of a substituted or unsubstituted alkyl ether and a substituted or unsubstituted aryl ether, and
wherein each of $Z_1$, $Z_4$, $Z_5$, $Z_8$, $Z_9$, $Z_{12}$, $Z_{13}$, and $Z_{16}$ is independently selected from the group consisting of a substituted or unsubstituted alkyl ether and a substituted or unsubstituted aryl ether.

6. The photosensitive composition of claim 5, wherein any substituted or unsubstituted alkyl ether of $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, and $Z_{16}$ has 6 or more carbon atoms, and
any substituted or unsubstituted aryl ether of $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, and $Z_{16}$ has 6 or more carbon atoms.

7. The photosensitive composition of claim 5, wherein each of the $Z_2$, $Z_3$, $Z_6$, $Z_7$, $Z_{10}$, $Z_{11}$, $Z_{14}$, and $Z_{15}$ is independently selected from the group consisting of

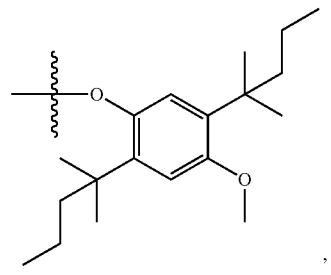

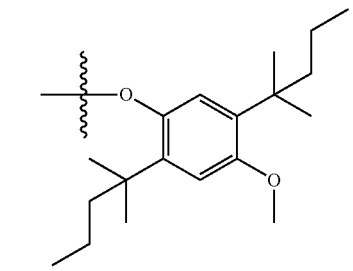

8. The photosensitive composition of claim 5, wherein each of the $Z_1$, $Z_4$, $Z_5$, $Z_8$, $Z_9$, $Z_{12}$, $Z_{13}$, and $Z_{16}$ is independently selected from the group consisting of

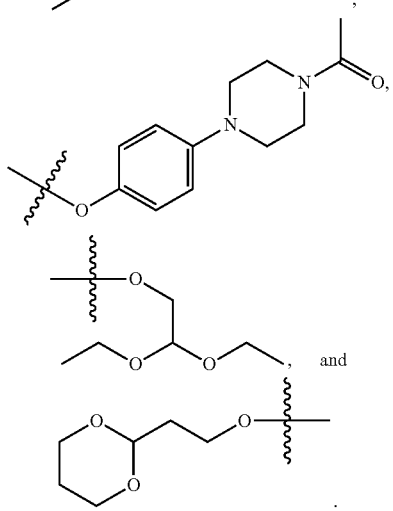

9. The photosensitive composition of claim 5, wherein an amount of the colorant is in a range of about 10 percentage by weight (wt %) to about 60 wt % with respect to a total weight of the photosensitive composition.

10. The photosensitive composition of claim 5, wherein an amount of the dye is in a range of about 5 wt % to about 50 wt % with respect to a total weight of the colorant.

11. The photosensitive composition of claim 5, wherein the binder resin comprises at least one of a phenolic resin and an acrylic resin.

12. The photosensitive composition of claim 5, further comprising an additive comprising at least one of a curing accelerator, a thermal polymerization inhibitor, a photosensitizer, a plasticizer, a dispersant, an adhesion promoter, a filler, and a surfactant.

13. The photosensitive composition of claim 12, wherein an amount of the additive is in a range of about 1 wt % to about 3 wt % with respect to a total weight of the photosensitive composition.

14. A color filter manufactured using the photosensitive composition of claim 5.

15. The photosensitive composition of claim 5, wherein an ether link and an alkyl/aryl substituent are introduced at both of a non-peripheral position and a peripheral position of an isoindole part of the dye.

* * * * *